(12) United States Patent
Kanaya

(10) Patent No.: US 7,814,528 B2
(45) Date of Patent: Oct. 12, 2010

(54) SYSTEM AND METHOD FOR PERFORMING BROADCAST LIKE DATA COMMUNICATION BETWEEN NETWORKED NODES

(75) Inventor: Mitsuhisa Kanaya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 2070 days.

(21) Appl. No.: 10/731,149

(22) Filed: Dec. 10, 2003

(65) Prior Publication Data
US 2004/0165214 A1 Aug. 26, 2004

(30) Foreign Application Priority Data
Dec. 10, 2002 (JP) ............... 2002-358039

(51) Int. Cl.
*H04N 7/173* (2006.01)
*H04N 7/18* (2006.01)
(52) U.S. Cl. .................. 725/141; 725/80; 725/133
(58) Field of Classification Search ............ 725/80, 725/133, 141
See application file for complete search history.

(56) References Cited

U.S. PATENT DOCUMENTS

| | | | |
|---|---|---|---|
| 5,220,373 A | 6/1993 | Kanaya | |
| 5,231,452 A | 7/1993 | Murayama et al. | |
| 5,822,077 A | 10/1998 | Sasaki et al. | |
| 6,226,011 B1 | 5/2001 | Sakuyama et al. | |
| 7,284,259 B1 * | 10/2007 | Takada et al. | ............... 725/80 |

FOREIGN PATENT DOCUMENTS

| | | |
|---|---|---|
| JP | 11-202698 | 7/1999 |
| JP | 2000-293322 | 10/2000 |
| JP | 2000-295382 | 10/2000 |
| JP | 2001-16382 | 1/2001 |

OTHER PUBLICATIONS

U.S. Appl. No. 09/120,219, filed Sep. 13, 2003.
U.S. Appl. No. 07/873,154, filed Apr. 24, 1992, Kanaya et al.
U.S. Appl. No. 09/558,225, filed Apr. 26, 2000, Urabe et al.
U.S. Appl. No. 09/641,917, filed Aug. 21, 2000, Watanabe.

* cited by examiner

*Primary Examiner*—Hunter B. Lonsberry
(74) *Attorney, Agent, or Firm*—Oblon, Spivak, McClelland, Maier & Neustadt, L.L.P.

(57) ABSTRACT

A method of transmitting image data from one node to another in a network includes obtaining image data in the node, transmitting the image data to the other node via an IEEE 1394 serial bus using one of isochronous transfer and asynchronous stream, and controlling the other node to form an image in accordance with the image data.

19 Claims, 7 Drawing Sheets

→ INSTRUCTION OF CONNECTION AS IMAGE TRANSMITTING APPARATUS

→ INSTRUCTION OF CONNECTION AS IMAGE FORMING APPARATUS

⌐ ⌐ DEACTIVATED APPARATUS (APPARATUS NOT
└ ┘ INVOLVED IN TANDEM IMAGE FORMATION)

FIG. 6
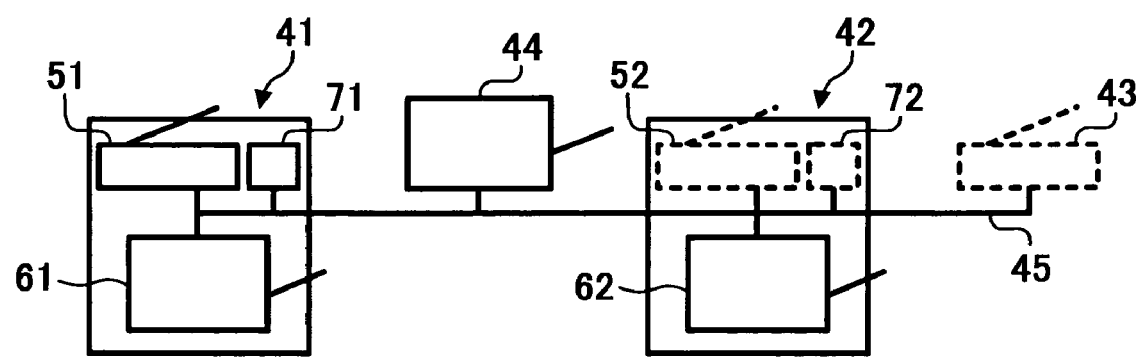
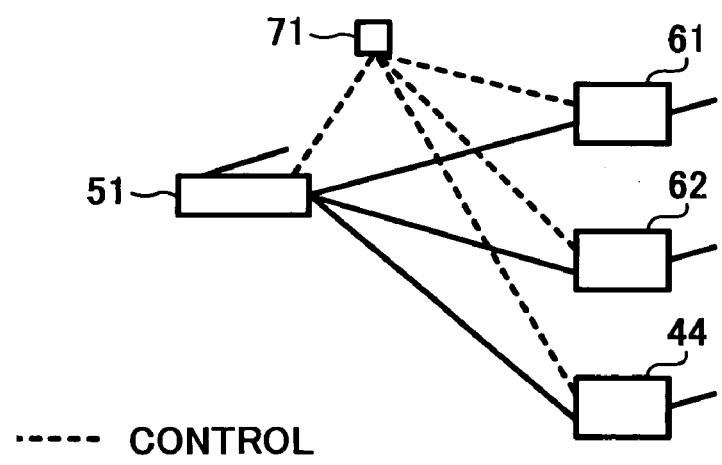
---- CONTROL

FIG. 8
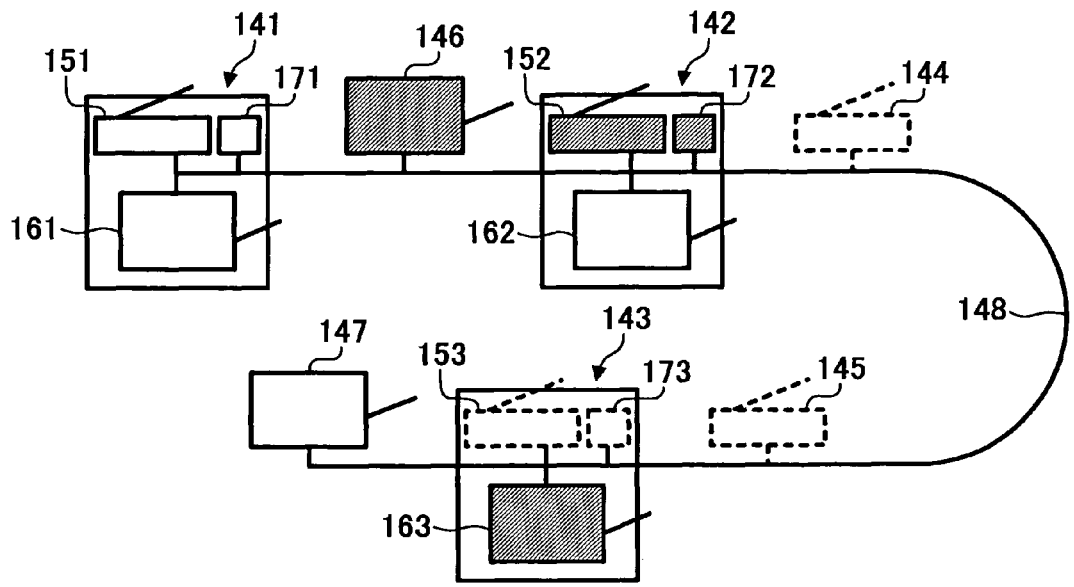
☐ APPARATUS INVOLVED IN 1st TANDEM IMAGE FORMATION
▨ APPARATUS INVOLVED IN 2nd TANDEM IMAGE FORMATION
⌐ ⌐ DEACTIVATED APPARATUS (APPARATUS NOT INVOLVED IN
└ ┘ TANDEM IMAGE FORMATION)
⇩
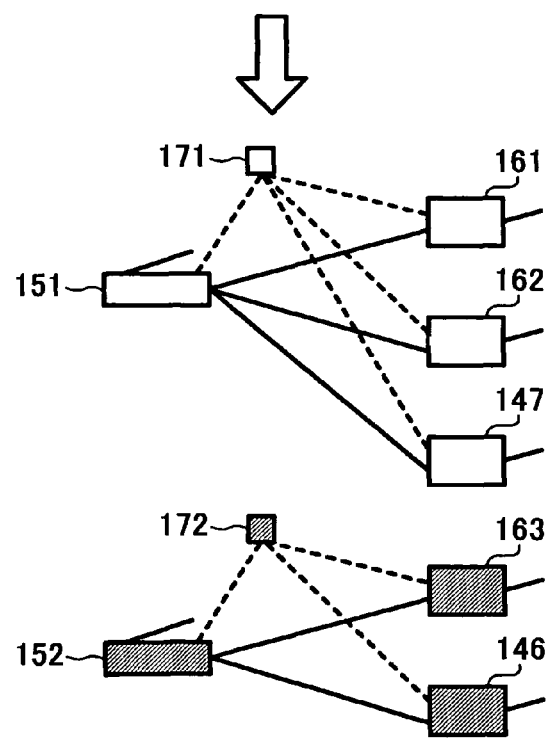

SYSTEM AND METHOD FOR PERFORMING BROADCAST LIKE DATA COMMUNICATION BETWEEN NETWORKED NODES

CROSS REFERENCE TO RELATED APPLICATION

This application claims priority under 35 USC §119 to Japanese Patent Application No. 2002-358039 filed on Dec. 10, 2002, the entire contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This specification relates generally to network systems and methods for transmitting image data from one node to another through the IEEE1394 aerial bus, and in particular, to such network systems and methods capable of transmitting image data in a broadcast like communication manner in order to perform tandem image formation within the network.

2. Discussion of the Related Art

The IEEE1394 was approved in 1995 as the IEEE 1394-1955 standard and is well known as a serial bus standard for use in digital data communication. P1394a and P1394b specifying the IEEE1394 have been similarly approved. A serial bus meeting the IEEE1394 standard is generally called an IEEE 1394 serial bus.

FIG. 1 illustrates a typical system meeting such an IEEE1394 standard. Specifically, various electronic instruments such as PCs, TVs, etc., meeting the IEEE1394 standard are employed as nodes 11. An IEEE serial bus 12 is formed from a cable meeting the IEEE1394 standard and serially connects the various electronic instruments. Connection terminals of the cable are each formed from a connecter having four, six, or more pins.

FIG. 2 illustrates a protocol meeting the IEEE1394 standard. The protocol of the IEEE1394 standard is formed, as is conventional, from a physical layer 21, a link layer 22, a transaction layer 23, and a serial bus control 25 that controls these three layers. Both of the physical and link layers 21 and 22 are formed from hard wares. Both the transaction layer 23 and serial bus 25 are formed from prescribed firm wares. An application layer 24 is provided as an upper link layer of the above-mentioned three layers.

The physical layer 21 executes bus configuration when bus rest, such as bus initialization, tree recognition, self-recognition, etc., takes place. The physical layer 21 also executes bus acquiring when packet transfer such as arbitration, etc., takes place. The link layer 22 executes packet transfer such as isochronous transfer, asynchronous transfer, asynchronous stream, etc., as described below. The transaction layer 23 executes an instructing operation such as "Read", "Write", "Lock", etc.

Since it has not been standardized by the IEEE1394-1995 standard, the application layer 24 is standardized by a SBP2 or SBP3 standard. The, SBP2 standard standardizes, for example, an operation relating to an initiator (i.e., a node forwarding an instruction) and a target (i.e., a node receiving the instruction). The serial bus control 25 is formed from a bus manager, an isochronous resource manager, and a node controller. The bus manager executes bus management such as topology map offering, speed map offering, etc. The isochronous resource manager executes isochronous resource management such as isochronous band allocation, channel number allocation, etc., as described infra. The node controller executes node control.

Various advantages of the EEEE1394 standard are exemplified as follows: The first is assurance of a real time performance enabled by isochronous transfer. The second is Hot-Plug-In realizing connection and disconnection while keeping power supply turned ON. The third is Plug and Play enabling automatic execution of bus configuration in response to the connection and disconnection.

In such an environment, the IEEE1394 serial bus has recently received attention as a serial bus that is used in order to connect instruments to each other in a digital copier, a digital copier to a peripheral such as an optional unit, and digital copiers to each other. For example, tandem copying and similar operations, in which image data from a digital copier is transmitted in order to simultaneously form images in other plural units of digital copiers, are attempted using the IEEE1394 serial bus as discussed in Japanese Patent Application Laid Open Nos. 2000-295382 and 2001-16382, which are herein incorporated by reference in their entirety.

Further, tandem printing and similar operations, in which image data from a scanner is transmitted in order to simultaneously form images in plural units of printers, are attempted using the IEEE1394 serial bus. For the purpose of overall comprehension of these operations, formation of images simultaneously performed by the plural units of image forming apparatuses will be referred to as tandem image formation.

Referring now to FIG. 3, a conventional tandem copier is briefly described. As shown, three units of digital copiers 31A, 31B, and 31C are serially connected via two IEEE1394 serial buses 32A and 32B.

Tandem copying is performed on condition that the digital copier 31A serves as an image transmission apparatus and remaining digital copiers 31B and 31C serve as image forming apparatuses. Specifically, the digital copier 31A obtains image data with its scanner unit and forms an image on a sheet or the like with its image formation unit in accordance with the image data. The digital copier 31A subsequently transmits the image data to the other digital copiers 31B and 31C. These digital copiers 31B and 31C then form images in accordance with the image data on sheets with their image forming units, respectively. As understood from the above, the former image formation relates to single unit copying, and the latter image formations relates to tandem copying.

In such tandem copying, since the digital copier 31A necessarily transmits image data to the digital copiers 31B and 31C after separately sending a communication inquiry signal and receiving a communication possible signal to and from each of the digital copiers 31B and 31C, a quantity of image data passing through the serial bus and a time period required in transmitting the image data amount to those for two units, when, for example, N number of units of digital copiers execute the tandem copying, the quantity of data and the time period amount to those for (N−1) units.

In such a way, increase in a unit number of digital copiers performing tandem copying results in large consumption of a common resource of a serial bus band and increasing in a transmission time period. Especially, when a quantity of image data is large in relation to the bus bandwidth (i.e., a data transfer speed), this may disable image data transfer to catch up an operation of the digital copier. Stated differently, a capacity of a serial bus may become a bottleneck when a digital copier performs tandem copying. This may take place not only in tandem copying, but also in other types of tandem image formation.

BRIEF SUMMARY OF THE INVENTION

Accordingly, it is an object of the present invention to address and resolve such problems and provide a new networked image data transmitting apparatus, networked image forming apparatus, and networked image transmission and formation control apparatus. These above and other objects are achieved by providing a novel networked image data transmitting apparatus including an image data obtaining section configured to obtain image data. The image data is then transmitted to at least one networked image forming apparatus via a serial bus in a broadcast like communication manner to form an image in the at least one networked image forming apparatus in accordance with the image data.

In another embodiment, a networked image forming apparatus is connected to a serial bus and includes an image data receiving section that receives image data from a networked image data transmitting apparatus via the serial bus in a broadcast like communication manner. An image forming section is also included to form an image in accordance with the image data.

In yet another embodiment, a networked image transmission and formation control apparatus is operative to define and transmits image data to at least one networked image forming apparatus via a serial bus in a broadcast like communication manner. The networked image transmission and formation control apparatus controls the at least one image forming apparatus to form an image in accordance with the image data.

In yet another embodiment, the serial bus is formed from the IEEE1394 serial bus.

In yet another embodiment, the broadcast like communication manner is performed using one of isochronous transfer and asynchronous stream.

In yet another embodiment, one of the networked image data transmitting apparatus and the networked image forming apparatus includes the image transmission and formation control apparatus.

In yet another embodiment, the image transmission and formation control apparatus can be an optional unit.

BRIEF DESCRIPTION OF DRAWINGS

A more complete appreciation of the present disclosure and many of the attendant advantages thereof will be readily obtained as the same becomes better understood by the following detailed description when considered in connection with the accompanying drawings, wherein:

FIG. 6 illustrates conception of connection formed after the association;

FIG. 8 illustrates another system executing tandem image formation.

PREFERRED EMBODIMENTS OF THE PRESENT INVENTION

Figure 1:
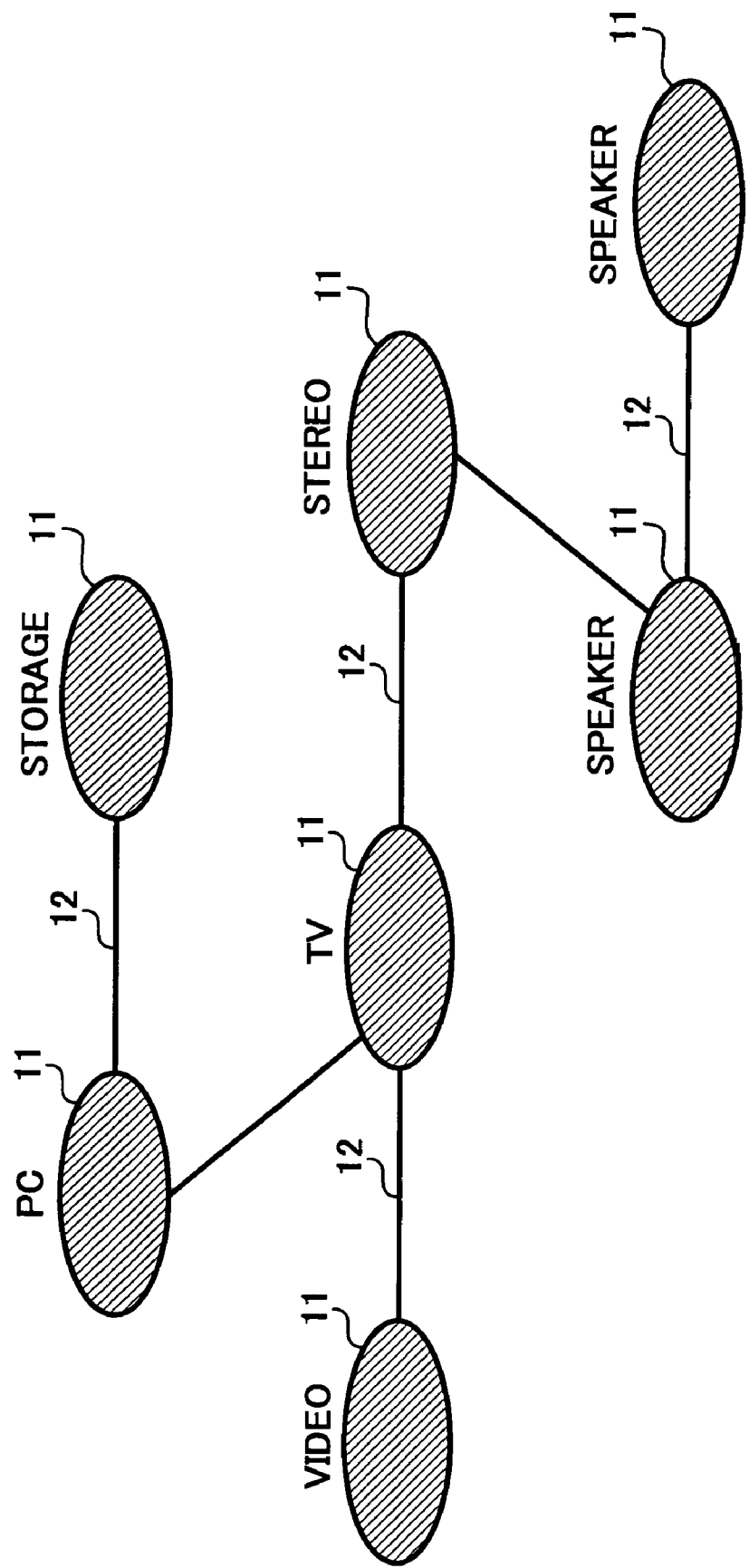
FIG. 1 illustrates a system meeting the IEEE1394 standard.
Figure 2:
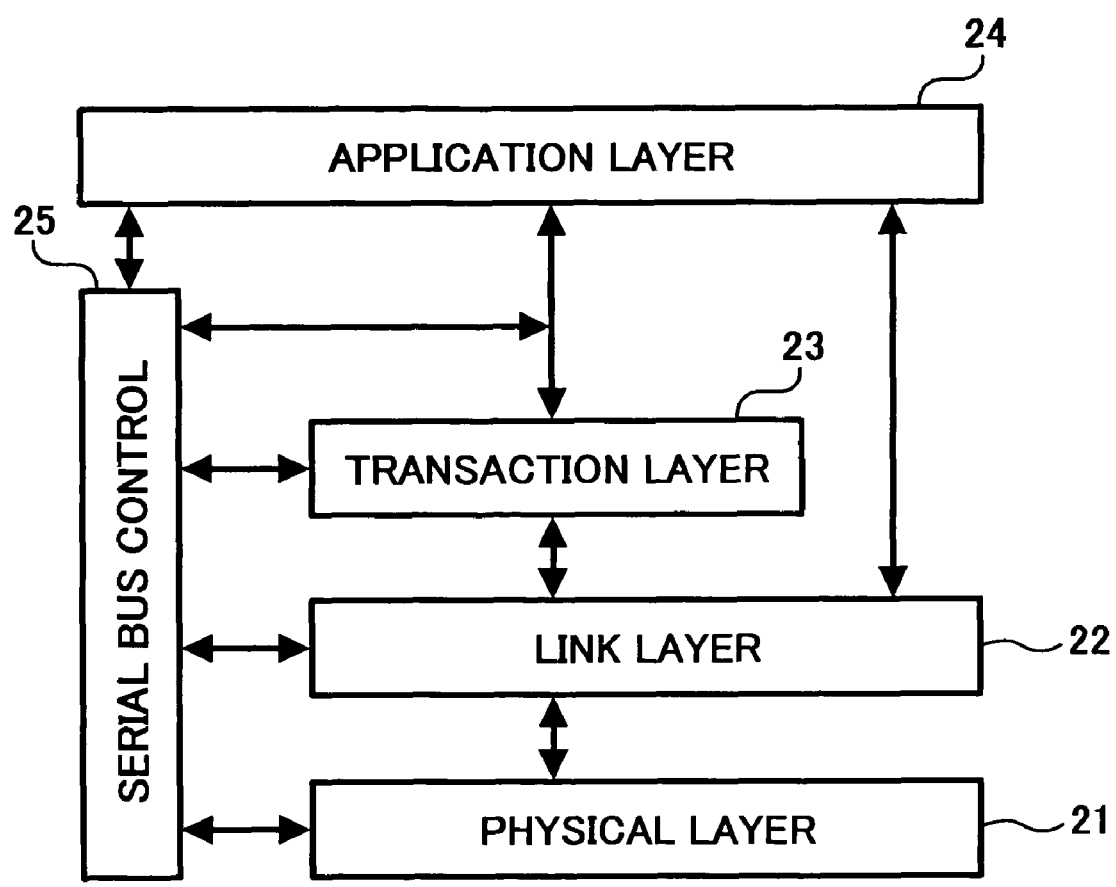
FIG. 2 illustrates a protocol meeting the IEEE1394 standard.
Figure 3:
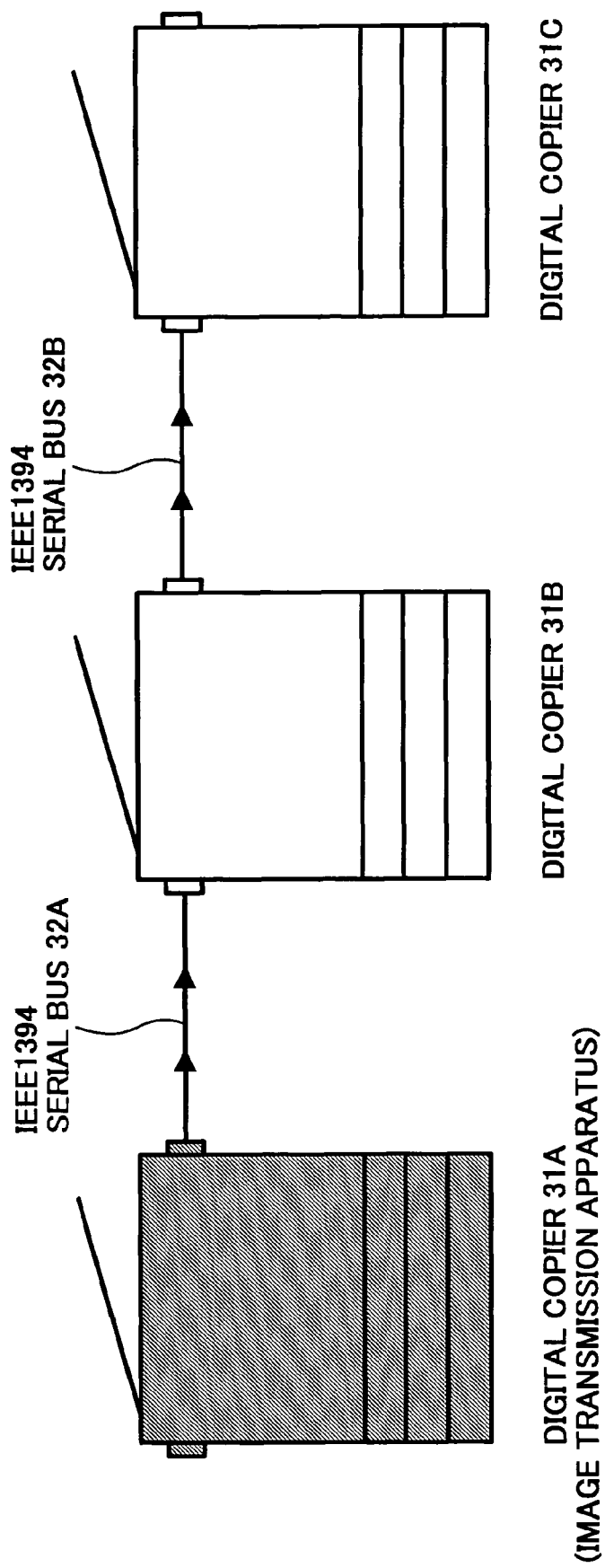
FIG. 3 illustrates conventional tandem copying system.
Figure 4:
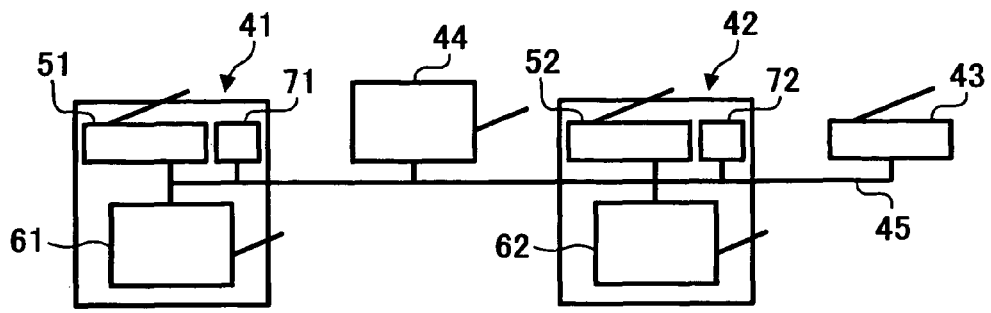
FIG. 4 illustrates a system executing tandem image formation.

Referring now to the drawings, wherein like reference numerals designate identical or corresponding parts throughout several views, in particular in FIG. 4, a system executing tandem image formation includes, but is not limited to, first and second digital copiers 41 and 42, a scanner 43, a printer 44, and an IEEE1394 serial bus 45 connecting these apparatuses. These digital copiers 41 and 42, scanner 43, and printer 44 meet the IEEE 1394 standard.

These digital copiers 41 and 42 house scanner units 51 and 52, image formation units 61 and 62, and tandem image formation control units 71 and 72, respectively. Each of the scanner units 51 and 52 obtains image data. Each of the image formation units 61 and 62 forms an image on a sheet or the like, for example, in accordance with the image data.

As shown, the scanner units 51 and 52 are connected to the image forming units 61 and 62, respectively, via the IEEE1394 serial bus 45. An inner bus can be employed to connect such units in the same copier.

Tandem image formation is now described in detail when the scanner unit 51 serves as an image transmission apparatus, and image forming units 61 and 62 and the printer 44 serve as image forming apparatuses.

When the tandem image formation is performed, one of tandem image formation control units 71 and 72 controls the image transmission and formation. A prescribed optional or additional unit or apparatus can, however, perform such a control independent from the digital copiers 41 and 42.

Figure 5:
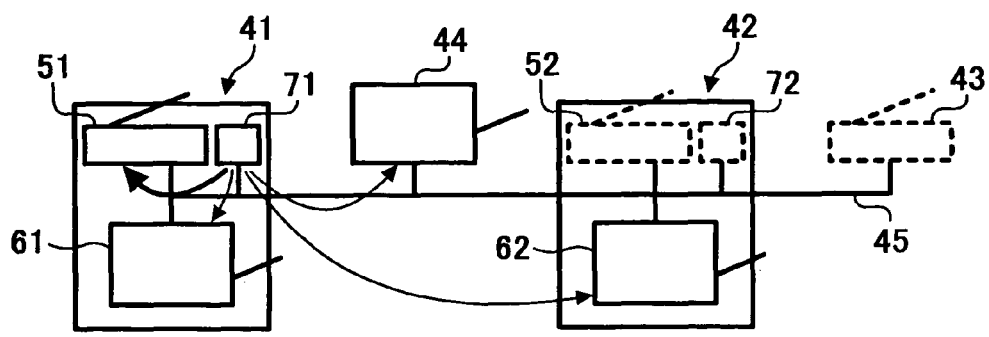
FIG. 5 illustrates a condition of association between nodes collectively performing tandem copying.

Initially, the image data transmission and forming apparatuses connected to the IEEE1394 serial bus 45 are associated with each other to define a sender and a recipient of image data upon receipt and in accordance with an instruction from the tandem image formation control units 71 or 72. A recipient serving as an image forming apparatus and its number are determined in accordance with a job to be processed. Under these circumstances, asynchronous transfer is utilized. The abovementioned association manner and condition are illustrated in FIGS. 5 and FIG. 6.

Referring back to FIG. 4, after the association, the scanner unit 51 obtains image data to be transmitted from the image data transmission apparatus to the plural units of image forming apparatuses. The image data is then transmitted to the entire units of image forming apparatuses connected to the IEEE1394 serial bus 45 in a broadcast like communication manner sequentially or after temporary buffered in a hard disk drive (HDD) and the like. That is, such broadcast like communication is performed without designating a specific recipient. Isochronous transfer or asynchronous stream can realize such a broadcast like communication. That is, when the isochronous transfer or the asynchronous stream is used, the image data from the image transmission apparatus can be transmitted to the plural image forming apparatuses in a broadcast like communication manner.

Thus, all of the plural image forming apparatuses can receive the image data even if the image transmission apparatus transmits the image data only once. As a result, since the image transmission apparatus needs not separately transmit the image data to each of the image forming apparatuses, tandem image formation can mitigate large consumption of a common resource of a bus band and increase in a transmission time period.

Further, it can be derived from the fact that the image data is sufficient if transmitted once that the bus bandwidth can be relatively narrower. Thus, a cost for a communication line can be reduced. Such an advantage becomes significant as a number of units of image forming apparatuses serving as tandem image forming apparatuses increases.

Broadcast like communication is continuously described more in detail. In a system meeting the IEEE1394, when a node performs isochronous transfer via such a serial bus, a band width and a channel number commonly used in the serial bus need be reserved in an isochronous manager in a preliminary step thereto. When the asynchronous stream is alternatively executed, a channel number used in transfer needs be similarly reserved. In any case, a channel number having been reserved need be reported to each of the nodes to be involved in image data communication. Every when such a reservation making activity, a reporting activity, and a releasing activity described below are performed, lock transaction by means of the asynchronous transfer is preferably utilized.

Further, a node such as an image transmission apparatus (i.e., an owner node of a resource) preferably executes the above-mentioned activities. Thus, the image transmission apparatus can detect a size of image data and acquire a necessary bandwidth. Thus, the system of FIG. 4 is efficient when isochronous transfer is executed, because a reservation for a bandwidth can be immediately acquired.

The resource owner node executing these activities can be an image forming apparatus serving as a root node, a bus manager, or an isochronous resource manager. Any of such systems is efficient especially when only a node under control of the present system is present on the serial bus even when a repeater node is additionally present thereon. When the isochronous resource manager performs the reservation making activity of a resource therein, communication overhead can be suppressed or even avoided on the serial bus. When the bus manager executes these activities, management of information relating to the resource and that of information relating to optimization of the serial bus and power supply or the like can be consolidated by the bus manager.

Further, when the bandwidth is not reserved in the reservation making activity of the resource, such an effect is reported to the tandem image formation control unit 71, and an error takes place, thereby image data transfer is not performed. When the channel number has failed to make a reservation, another reservation is reattempted with another number. When the entire channel numbers could not be reserved at all, errors take place and image data transfer is not performed. When the asynchronous stream is used and none of the channel numbers could be reserved, a default broadcast channel number (e.g., No. 31) standardized by the P1394a standard, can be utilized.

Further, when a bus reset takes place during image data transfer and thereby the resource needs be obtained again while a root node or the like changes in accordance with a change in bus topology, a node having been the owner node of the resource before the bus reset occurs, or a node (e.g. a current root node or the like) to secure a resource at the present moment is designed to secure a new resource. When securing such a new resource results in failure, such an effect is reported to the tandem image formation control unit 71, and thereby an error takes place. Thus, image data transfer is cancelled.

Figure 7:
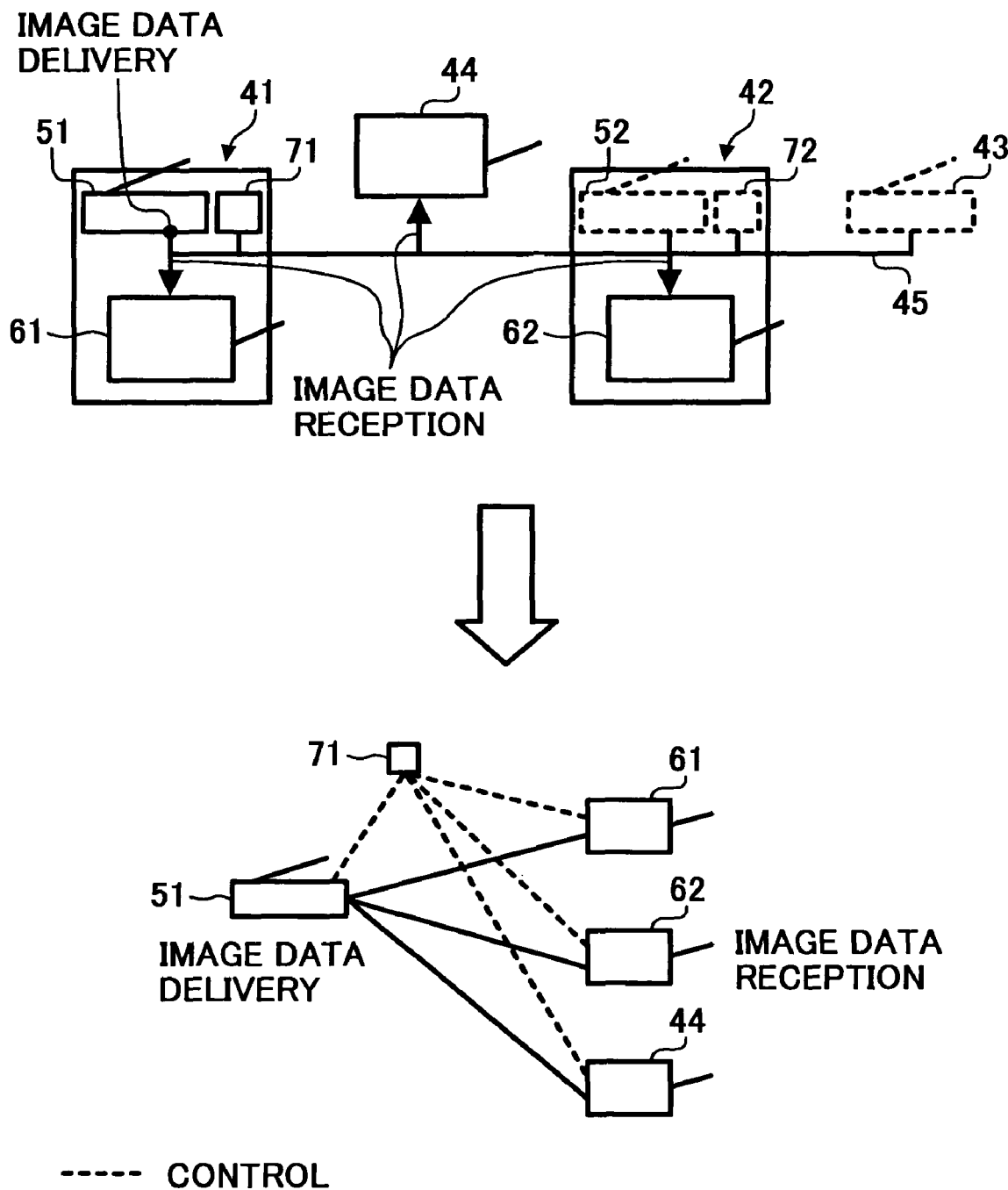
FIG. 7 illustrates conception of data communication to be performed after the association.

When an activity of a preliminary step to the transfer of image data is completed as mentioned above, the image data is practically transferred. A channel number secured is used as a transfer channel for the image data. Specifically, as shown in FIG. 7, the image transmission apparatus transmits the image data to the channel number, and image forming apparatus listens to the image data from the channel number.

Upon completion of the image data transfer, the owner node of the resource preferably releases the bandwidth and channel number used in the image data transfer, and such an effect is reported to the tandem image formation control unit 71. In short, image data from the image transmission apparatus is transmitted to the plural units of image forming apparatuses in the broadcast like communication manner, and these plural image formation apparatuses can simultaneously form images in accordance with the image data.

Several modifications are now described. A scanner unit of a facsimile or a facsimile having a scanner unit, a digital camera, a digital video camera, a personal computer, a CD-ROM drive, a CD-R drive, a CD-RW drive, a DVD drive, and an HDD or the like can be employed as an image data transfer apparatus.

Further, an image formation unit of a facsimile or a facsimile having an image formation unit can be employed as an image forming apparatus.

Further, as an apparatus simultaneously serving as the above-mentioned image transmission and formation apparatuses, a digital copier including a scanner unit and an image formation unit, and a facsimile including such apparatuses are exemplified. Further, the present invention can be appropriately applied to tandem image formation practiced with the other type of a serial bus.

Further, since the IEEE1394 serial bus is widely utilized in various consumer instruments or the like, the below listed advantages can be obtained. First, the IEEE1394 serial bus can be relatively readily available. A cost is moderate. The serial bus can be used in applications other than the tandem image formation.

A multiple tandem image formation using an IEEE 1394 serial bus is now described with reference to FIG. 8. The multiple tandem image formations share resources such as a bandwidth, a channel number, etc. Such sharing is generally possible as far as the resources allow. Thus, an advantage such as an efficient use of a resource and a node can be provided.

The system includes, but is not limited to, first to third digital copiers 141, 142, and 143, first and second scanners 144 and 145, first and second printers 146 and 147, and an IEEE serial bus 148 connecting these apparatuses. The digital copiers 141, 142, and 143 includes, but are not limited to, scanner units 151, 152, and 153, image formation units 151, 152, and 153, and tandem image formation control units 171, 172, and 173, respectively. As shown, first and second tandem image formations are performed. In particular, in the first tandem image formation, the scanner unit 151 serves as an image transmission apparatus, the image formation units 161 and 162, and the printer 147 serve as image forming apparatuses, and the tandem image formation control unit 171 controls these apparatuses. In the second tandem image formation, the scanner unit 152 serves as an image transmission apparatus, the image forming unit 161 and the printer 146 serve as image forming apparatuses, and the tandem image formation control unit 172 controls these apparatuses. Details of broadcast like communication for the first and second tandem image formations and so on are similarly performed as in the system of FIG. 4.

Obviously, numerous additional modifications and variations of the present invention are possible in light of the above teachings. It is therefore to be understood that within the scope of the appended claims, the present invention may be practiced other than as specifically described in the examples herein.

The invention claimed is:

1. A networked image data transmitting apparatus, comprising:
   an image data obtaining section configured to obtain image data;
   a first networked image forming apparatus configured to receive the image data and to form an image; and
   a serial bus configured to simultaneously transmit the image data from the image data obtaining section to the first networked image forming apparatus and to at least one other networked image forming apparatus.

2. A networked image forming apparatus connected to a serial bus, comprising:
   a first image data receiving section configured to receive image data from a networked image data transmitting apparatus via the serial bus, wherein the image data was broadcast simultaneously to at least one other image forming apparatus; and
   an image forming section configured to form an image in accordance with the image data.

3. A networked image transmission and formation control apparatus, comprising:
   a controller configured to control simultaneous transmission of image data to a first networked image forming apparatus and to at least one other networked image forming apparatus via a serial bus to form an image with the networked image forming apparatuses in accordance with the image data.

4. The networked image transmission and formation control apparatus according to claim 3, wherein the controller is configured to transmit the data via an IEEE 1394 serial bus.

5. The networked image data transmitting apparatus according to claim 1, wherein the serial bus is configured to transmit the image data in one of isochronous transfer and asynchronous stream.

6. The networked image forming apparatus according to claim 2, wherein the image data receiving section is configured to receive the image in one of isochronous transfer and asynchronous stream.

7. The image transmission and formation control apparatus according to claim 3, wherein the controller is configured to transmit the image data in one of isochronous transfer and asynchronous stream.

8. The networked image data transmitting apparatus according to claim 1, further comprising:
   a networked image transmission and formation control apparatus configured to simultaneously transmit the image data to the first networked image forming apparatus and to the at least one other networked image forming apparatus via the serial bus.

9. The networked image forming apparatus according to claim 2, further comprising:
   a networked image transmission and formation control apparatus configured to simultaneously transmit the image data to the first image data receiving section and to the at least one other image data receiving section via the serial bus.

10. The networked image data transmitting apparatus according to claim 1, further comprising:
    a networked image transmission and formation control apparatus configured to simultaneously transmit the image data to the first networked image forming apparatus and to the at least one other networked image forming apparatus via the serial bus, and the networked image transmission formation control apparatus is a separate unit from the image data obtaining section and the first networked image forming apparatus.

11. The networked image forming apparatus according to claim 2, further comprising:
    a networked image transmission and formation control apparatus configured to simultaneously transmit the image data to the first image data receiving section and to the at least one other image data receiving section via the serial bus, and the networked image transmission formation control apparatus is a separate unit from the image forming section and the first image data receiving section.

12. A method of transmitting image data from a first node to a second node in a network, comprising:
    obtaining image data from the first node;
    simultaneously transmitting the image data to the second node and to at least one other node via an IEEE1394 serial bus using one of isochronous transfer and asynchronous stream; and
    controlling the second node to form an image in accordance with the image data.

13. A networked image data transmitting apparatus comprising:
    means for obtaining image data;
    a first means for receiving the image data and forming an image based on the image data; and
    a serial bus configured to simultaneously transmit the image data from the means for obtaining image data to the first means for receiving image data and to at least one other means for receiving the image data and forming the image.

14. The networked image data transmitting apparatus according to claim 1, further comprising:
    a networked image transmission and formation control apparatus configured to detect a size of image data and to reserve a bandwidth.

15. The networked image data transmitting apparatus according to claim 1, further comprising:
    a networked image transmission and formation control apparatus configured to manage information relating to the networked image data transmitting apparatuses and/or optimization of the serial bus.

16. The networked image data transmitting apparatus according to claim 1, further comprising:
    a networked image transmission and formation control apparatus configured to reserve a channel number used in the serial bus.

17. The networked image data transmitting apparatus according to claim 16, wherein the networked image transmission and formation control apparatus is configured to reserve a default broadcast channel when no channel number in the serial bus could be reserved.

18. The networked image data transmitting apparatus according to claim 16, wherein the networked image transmission and formation control apparatus is configured to direct the simultaneous transmission of the image data only to networked image forming apparatuses configured to use the channel number reserved in the serial bus.

19. The networked image data transmitting apparatus according to claim 16, wherein the networked image transmission and formation control apparatus is configured to use the channel number reserved in the serial bus along with another networked image transmission and formation control apparatus.

* * * * *